United States Patent [19]

Wishart

[11] 4,186,561
[45] Feb. 5, 1980

[54] SPLIT CYCLE INTERNAL COMBUSTION ENGINES

[76] Inventor: John D. Wishart, 8 Chapel St., Blackburn, Victoria, 3130, Australia

[21] Appl. No.: 944,653

[22] Filed: Sep. 21, 1978

[30] Foreign Application Priority Data

Sep. 22, 1977 [AU] Australia .............................. PD1772
Jun. 29, 1978 [AU] Australia .............................. PD4909

[51] Int. Cl.² ............................................. F02B 73/00
[52] U.S. Cl. ................................................... 60/620
[58] Field of Search ................ 60/597, 599, 620, 621, 60/622, 605

[56] References Cited

U.S. PATENT DOCUMENTS

3,408,811  11/1968  Wishart ............................ 60/620 X

Primary Examiner—Wendell E. Burns
Attorney, Agent, or Firm—Cushman, Darby & Cushman

[57] ABSTRACT

A split cycle internal combustion engine of the kind described in U.S. Pat. No. 3,408,811, in which the only ignition means is heat supplied from an external source such as an incandescent tube or a heater for the admitted air and which advance and retardance of the ignition is effected by automatically controlling the timing of the admission of fuel and the heated air to the combustion chamber in response to the load upon the engine. This is achieved by lengthening or shortening a pivoted telescopic lever attached to the cam followers for the fuel pump and the transfer valve admitting the air. By driving the low pressure stage of the compressor from a different throw of the crankshaft from the higher pressure stages, a compact and well-balanced engine may be designed.

13 Claims, 21 Drawing Figures

SPLIT CYCLE INTERNAL COMBUSTION ENGINES

BACKGROUND OF THE INVENTION

This invention relates to split cycle internal combustion engines as described in my Australian Pat. Nos. 286539 and 416564 and my corresponding U.S. Pat. No. 3,408,811, British Patent Nos. 1,120,248 and 1,190,948, Canadian Patent No. 804343, Japanese Utility Model No. 50-22161, Italian Patent No. 725787, French Patent No. 1,443,008, and West German Patent Application No. 1,576,035.

The major characteristic of this kind of engine is the splitting of the cycle of operations into two separate groups, performed respectively in cylinders kept hot and in cylinders kept cold. All engines working on this split cycle compress the charge air to a very high pressure in a compressor consisting of two or more cold cylinders arranged in series of progressively decreasing size operating at progressively increasing pressure, the air being cooled as it passes from each cylinder to the next higher cylinder in pressure. The highly compressed air from the final compression stage is then passed to at least one small firing cylinder kept hot, in which the fuel is ignited to provide the power for the engine. The firing cylinder has minimal working clearance between the top of the power piston and the cylinder head, and the combustion dome is of small capacity. The high pressure air with fuel entrained begins to enter through a small transfer valve when the power piston is at or near top dead centre, and continues to enter and burn while the piston is moving down the first part of its power stroke. Engines of this construction are herein referred to as "split cycle engines of the kind described".

Each firing cylinder may have alongside it a larger cylinder to which it is connected by an insulated port low down its bore, which port is uncovered by the power piston as it continues its downward stroke. This is known as compound expansion, and when in use a major portion of the combustion charge, after being partly expanded in the firing cylinder, is passed through the port to the expansion cylinder for further expansion. A poppet valve in the head of each cylinder then exhausts the spent combustion products to the atmosphere.

Engines working on the split cycle principle normally operate at high compression pressures up to four or five times the compression pressures in conventional spark plug ignition petrol engines. Experience has shown that, while spark plug ignition engines of the split cycle type show the expected high efficiency and freedom from pollution, the spark plugs must operate at higher than conventional voltage, and so have a much shorter life span than in conventional engines. With conventional hot plug or incandescent tube ignition, the firing of the engine is somewhat erratic, and it is not possible to vary the ignition timing in response to variations in the load on the engine.

Accordingly, it is the principal object of the present invention to provide split cycle engines of the kind described having ignition means which can be varied with precision to accommodate variations in the load upon the engine, and which only require maintenance at approximately the same intervals as the remaining components of the engine.

It is a further object of the present invention to exploit to a greater degree than in the already proposed split cycle engines the potential of this type of engine for perfection in balance and reduction in bearing and piston friction.

SUMMARY OF THE INVENTION

In order to achieve the above stated principal object, the present invention provides a split cycle internal combustion engine comprising a crankshaft, at least one firing cylinder, for each firing cylinder an expansion cylinder adjacent thereto, each firing cylinder having a transfer port in the lower region of the combustion chamber communicating with the top of the adjacent expansion cylinder, a multistage compressor comprising at least two cylinders operating in series, a piston in each cylinder, means directing air supplied by the high pressure stage of the compressor to the combustion zone of each firing cylinder during the first part of the power stroke, means supplying fuel to the combustion zone of each firing cylinder to mix intimately in the correct proportion with the entering compressed air, and means external of each firing cylinder heating the air before entry to the top of the combustion zone, characterised in that ignition is controlled by timing the admission of fuel and of compressed air in relation to the position of the piston in each firing cylinder.

Preferably, the ignition timing is advanced or retarded by external means varying the stage of rotation of the crankshaft at which a cam rotating with the crankshaft lifts cam followers operating a fuel pump and a transfer valve for the heated air.

In one embodiment of the invention, ignition of the charge is initiated in an externally heated extension of the combustion chamber, said extension being of small volume relative to the combustion chamber.

In another embodiment, ignition of the main charge is initiated by admitting a preheated, partially compressed pilot charge of air to the firing cylinder, and further compressing it in the cylinder to further increase its temperature and to thereby ignite a precision-timed pilot spray of fuel of lower temperature of ignition than the main fuel used in the engine.

The time of commencement of admission of fuel and of compressed air may each be controlled by a cam and a pivoted lever supporting a cam follower in contact with the cam, the length of the lever between the pivot and the cam engaging portion of the cam follower being varied by a linkage actuated by a centrifugal timing mechanism or by air pressure sensing means connected to the compressor outlet.

The admission and amount of fuel supplied may each be controlled by two levers lifted by the cam follower, resting one on top of the other, with the upper lever contacting the plunger of a plunger type fuel pump, the pivots for the respective levers lying on opposite sides of the cam follower, and the distance between the pivots being varied in response to variation in the pressure of air leaving the compressor.

The above stated further object is achieved, according to the present invention, by employing a multi-throw crankshaft and connecting the piston in the low pressure stage of the compressor to a different throw of the crankshaft from the piston or pistons in the higher pressure stages.

In one configuration of the engine, the firing cylinder and the expansion cylinder are arranged in line with, and are connected to different throws of, the crankshaft, and the compression cylinders are arranged in line at 90 degrees to the firing and expansion cylinders, with their pistons connected respectively to the same crank throw as the firing or expansion piston.

In another configuration, the engine comprises a plurality of firing cylinders in line parallel to the axis of the crankshaft, an equal number of expansion cylinders in line to the side of the firing cylinders, compression cylinders in line at the side of the expansion cylinders remote from the firing cylinders, each firing cylinder with its adjacent expansion cylinder and compression cylinder constituting a triple cylinder complex lying on a line perpendicular to the axis of the crankshaft, a rockable beam pivoted at its ends to the compression piston and expansion piston respectively of each complex, means connecting the beam to one throw of the crankshaft to rock the beam in timed relation to the rotation of the crankshaft, and a connecting rod connecting the said throw of the crankshaft to the firing piston.

The means rocking the beam may, for example, comprise a lever fixed perpendicularly across the beam, said lever being rotatable at one end about a pivot fixed with respect to the cylinders and at the other end pivoted to a connecting rod linking it to the throw of the crankshaft.

For initial starting up from rest, or boosting the power for short periods while running, compressed air may be supplied to the firing cylinder from a cellular storage tank replenished by the engine during normal running.

Magnetic means may be employed to controllably reduce the power of the engine by permitting portion of the air compressed in the low pressure cylinder to be exhaled to the atmosphere.

DESCRIPTION OF THE DRAWINGS

Practical arrangements of engines according to the present invention will now be described with reference to the accompanying drawings. In these drawings.

DETAILED DESCRIPTION OF EMBODIMENTS SHOWN IN THE DRAWINGS

Figure 1:
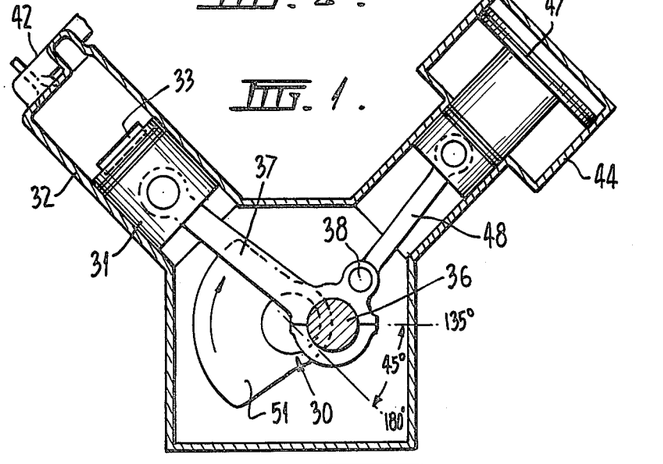
FIG. 1 is a transverse cross section of a four cylinder engine through one throw of the crankshaft.
Figure 2:
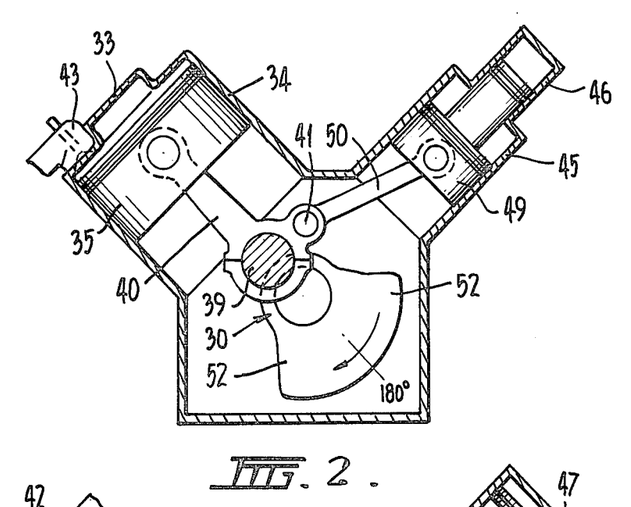
FIG. 2 is a transverse cross section of the engine shown in FIG. 1 through the other throw of the crankshaft.
Figure 3:
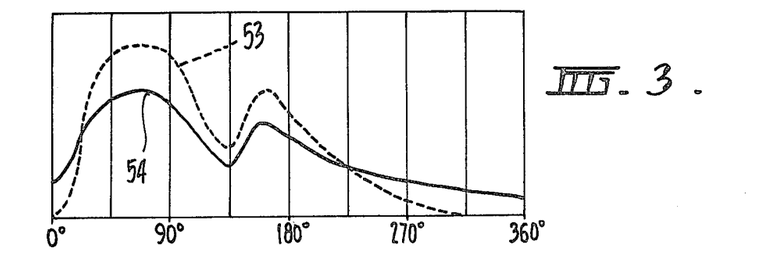
FIG. 3 is a crank effort diagram of the engine shown in FIGS. 1 and 2.

Referring to FIGS. 1 to 3, the four cylinders are arranged in two 90 degree Vees one behind the other, the pistons in all four cylinders being connected to a common two-throw crankshaft 30. In the position shown in FIGS. 1 and 2, the piston 31 in the firing cylinder 32 is beginning to uncover the port 33 which leads to the top of the expansion cylinder 34, and the piston 35 in the expansion cylinder is beginning to descend on its power stroke. The piston 31 is connected to the crankpin 36 by a connecting rod 37 having on its bigend a wristpin 38. The piston 35 is connected to the crankpin 39 by a connecting rod 40 having on its bigend a wristpin 41. The expansion cylinder 34 has approximately four times the swept volume of the firing cylinder 32 and the connecting rod 40 is shorter than rod 37, so that the piston 35 is at all times below the port 33. The piston 31 only uncovers the port 33 when the piston is less than 45 degrees either side of bottom dead centre. During this time, the piston 35 has moved from the top dead centre to approximately 90 degrees later, and approximately 75% of the burning gases have passed into the cylinder 34. At this time, as the piston 31 rises to cover the port 33, the exhaust valve 42 on the firing cylinder 32 opens, while the expansion piston 35 continues its power stroke and the exhaust valve 43 in the expansion cylinder 34 opens later. This timing requires that the crankpin 39 be 45 degrees earlier in relation to the crankpin 36 than the 180 degree difference usual in a two-throw crankshaft.

A cylinder 44 and duplex cylinders 45 and 46 on the other side of the Vee constitute the compressor. The cylinder 44 has a double acting piston 47, and constitutes the low pressure stage of the compressor. The piston 47 is connected to the wristpin 38 by a connecting rod 48. The cylinder 45 of the duplex cylinder is the intermediate pressure stage of the compressor, and the cylinder 46 is the high pressure stage. The single piston 49 working in both cylinders is connected to the wristpin 41 by a connecting rod 50.

The three poppet valves on the engine are operated by cams (not shown) mounted direct on the front end of the crankshaft. The effect of piston inertia on flywheel vibration is negligible, because one of the four pistons reverses its direction of travel each 45 degrees of crankshaft rotation, in contrast to the situation in a conventional four cylinders in line engine where all four pistons reverse together. The crankpin arrangement of FIGS. 1 and 2 does not affect mechanical balance because each of the two crank-throws is separately balanced by means of balance weights 51 and 52. The power balance is also greatly improved, because the compressor cylinders 44, 45 and 46 are absorbing most of the power needed to compress the air, at the time when the power cylinders 32 and 34 are developing most power; also, when the cylinders 45 and 46 are receiving air compressed in cylinder 44, and thereby developing useful power, the power cylinders 32 and 34 are not supplying power. This feature is shown in FIG. 3, which is the Crank Effort Diagram at Full Load. The dotted line 53 represents the crank effort of the power cylinders 32 and 34, while the full line 54 represents the positive crank effort over 360 degrees, when the crank effort from the compressor cylinders 44, 45 and 46 is superimposed on the line 53.

Figure 4:
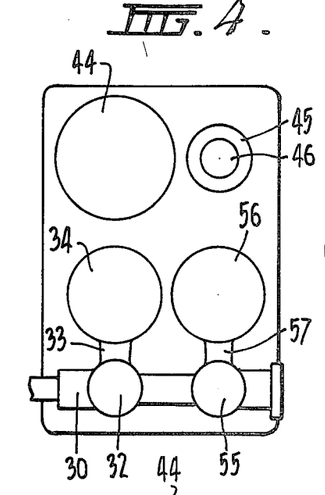
FIG. 4 is a schematic plan of a six cylinder engine.
Figure 5:
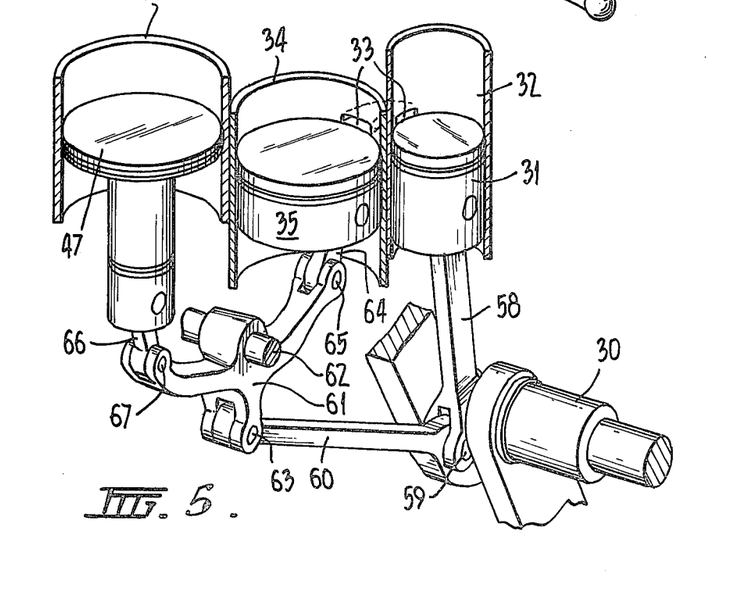
FIG. 5 is a diagrammatic cross section through one throw of the crankshaft of the engine shown in FIG. 4.

In the six cylinder engine illustrated in FIGS. 4 and 5, the cylinders are vertical and are arranged in two rows of three located one row behind the other on the two-throw crankshaft 30. Each row constitutes a complex consisting of a firing cylinder (32 and 55 respectively), an expansion cylinder (34 and 56), and a compressor cylinder. The compressor cylinder 44 associated with the cylinders 32 and 34 is the low pressure stage of the compressor, while the compressor cylinder associated with the cylinders 55 and 56 is a duplex cylinder 45 and 46 of the construction described with reference to FIG. 2, and constitutes the intermediate and high pressure stages respectively of the compressor. The cylinders 32 and 34 are connected by the transfer port 33, and the cylinders 55 and 56 are connected by the transfer port 57.

The operation of the row of cylinders 32, 34 and 44 is shown in greater detail in FIG. 5. A connecting rod 58, which connects the piston 31 to the crankshaft 30 has a wristpin 59 formed on its bigend, from which a connecting rod 60 oscillates a T shaped beam 61 about a central offset pivot 62 rigidly secured to the engine block. The connecting rod 60 is pivoted at 63 to the vertical arm of the T shaped beam 61. A connecting rod 64 from the piston 35 is pivoted at 65 to one end of the cross arm of the T shaped beam 61. A connecting rod 66 from the piston 47 is pivoted at 67 to the remaining end of the cross arm of the beam 61. The six poppet valves of the complete engine are driven from cams on an overhead camshaft rotating at crankshaft speed.

This engine has two firing cylinders and two expansion cylinders, each giving a power impulse on each revolution of the crankshaft. This is the same number of impulses as is given by a conventional eight cylinder in line engine, and the power balance and crank effort are therefore very even, with the mechanical balance also excellent.

Engine speed and power are controlled by reducing the amount of atmospheric air inhaled by the compression cylinder. One method of achieving this is the "reverse flow regulation" known in the air compressor industry. In this method, the inlet valves are held open during the suction stroke and for part of the succeeding compression stroke, so that part of the inhaled air is discharged back to the atmosphere. A novel arrangement for carrying this method into effect will now be described with reference to FIG. 6. Several of these inlet valves are employed on the low pressure cylinder of each compressor. If the cylinder is double acting, there is a set of these valves at each end.

Figure 6:
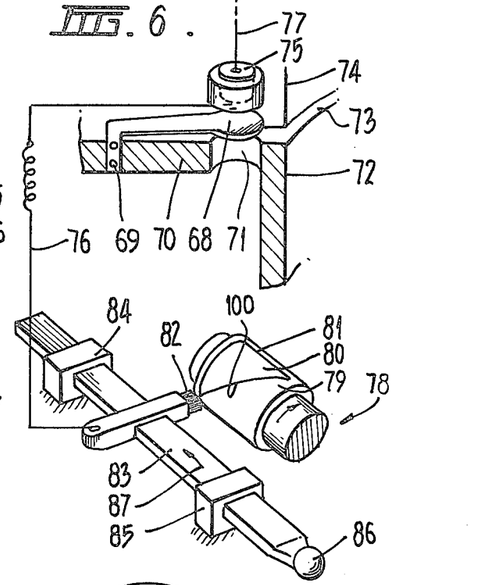
FIG. 6 is a partial cross section of a means of controlling the engines.

A valve 68 is stamped out of thin flat magnetic spring steel. It has a round head and an extension arm having screws 69 passing through it at the end remote from the head to locate the valve at the side of the cylinder head in the external flange 70 with the head of the valve covering a port 71 open to the atmosphere and communicating with the interior of the cylinder 72 through the passage 73, which is a channel extending around the internal wall of the cylinder. A cover 74 over the valve and cylinder head houses a solenoid 75 consisting of a soft iron bobbin with a coil of thin insulated copper wire wound around its core. This coil is connected at one end to electrical lead 76 and at the other end to an electrical lead 77, which is connected to one terminal of a battery (not shown) earthed at the other terminal. All coils at one end of the cylinder are preferably wired up in series between electrical leads 76 and 77. The stream of atmospheric air entering through the port 71 on the suction stroke of the compressor piston lifts the head of the valve so that it contacts the core of solenoid 75. If no current is flowing through the solenoid, the valve springs back to close the port 71 when the piston begins its compression stroke. If, however, current is passing through the solenoid 75, the magnetic effect will hold the valve 68 in the open position until the current is interrupted.

The flow of current through the solenoid 75 is started and stopped by a switching device 78. This device comprises a non-conducting commutator 79 rotating at the same speed as the engine crankshaft. An earthing strip 80 is fixed to the external curved surface of the commutator, in contact with a conducting lead (not shown) which earths it to the engine frame. When projected on to a flat plane, the earthing strip 80 has the shape of a right angled triangle, the leading edge 81 being one of the perpendicular sides. The hypoteneuse 100 is the trailing edge of the strip, which is fixed in such relation to the commutator 79 that the leading edge 81 is parallel to the longitudinal axis of the commutator. A spring loaded carbon brush 82 is maintained in contact with the curved surface of the commutator 79 and is connected to the lead 76, with the result that, when the brush 82 is in contact with the earthing strip 80, electric current flows along the lead 77, through the solenoid 75, through the lead 76, the brush 82 and the strip 80 to earth. The duration of the current flow, and therefore of the holding open of the valve 68, is varied by moving the brush 82 longitudinally along the commutator 79. The closer the brush 82 is to the wide end of the strip 80, the longer the valve 68 is held open. This longitudinal movement of the brush 82 is effected by external control means, for example an accelerator pedal or an engine speed governor. A slidable mounting strip 83 to which the brush 82 is fixed, slides through fixed guides 84 and 85 in response to force from the external control means applied through a linkage to the ball 86. As the strip 83 is pushed in the direction of the arrow 87, the valve 68 is held open for a longer period, so that more of the compressed air is exhaled from the cylinder 72 thereby reducing the amount and pressure of the compressed air supplied to the engine.

If a double acting compressor cylinder is employed, valves 68 must be fitted at both ends of the cylinder 72, those at each end being controlled by a brush and earthing strip as above described, the strips being displaced 180 degrees with respect to each other, and moved in unison as ball 86 is moved.

High pressure air is being compressed throughout the whole time that a split cycle engine is in operation, and portion of this air may be readily and safely stored for use in starting the engine or for giving it a boost of power for a short period of acceleration.

Figures 7, 8, 9:
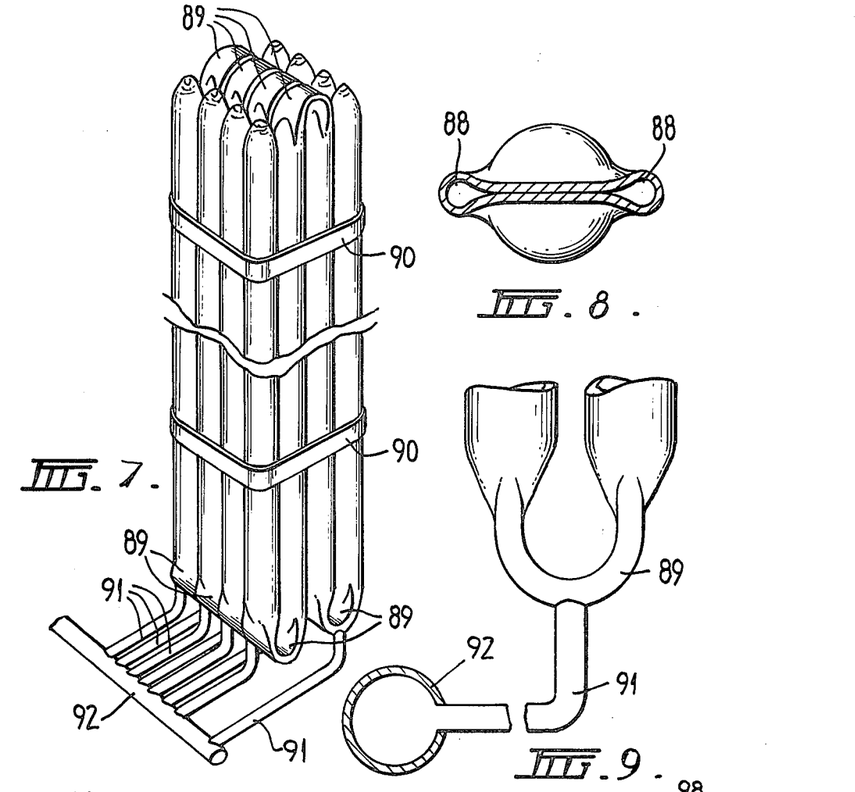
FIG. 7 is a perspective view of an air storage receiver.
FIGS. 8 and 9 show details of the receiver shown in FIG. 7.

FIGS. 7 to 9 show a cellular, and therefore explosion free, air storage receiver to store high pressure air bled from the compressor delivery pipe during previous operation. The air storage receiver is made from four stainless steel tubes. Each tube is sealed at each end by welds, and at three equidistant locations along its length each tube is flattened to provide relatively small parallel air channels 88 as shown in FIG. 8. Each flattened portion is then bent through 180 degrees as shown at 89 in FIG. 9 to allow the four lengths between the flattened portions to fold alongside one another, with one loop at the top between the two sealed ends of the tube and two loops at the bottom. The four tubes so folded are then placed together and held by bands 90 to form a single assembly as shown in FIG. 7. The eight loops at the bottom of the assembly each have a small bore tube 91 welded to one of the two air channels 88. The eight free ends of the eight tubes 91 open into a feeder pipe 92, which is the means whereby the compressed air enters and leaves the receiver.

Figure 10:
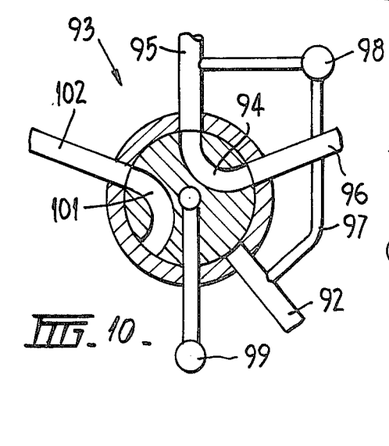
FIGS. 10 and 11 are cross sections of a valve connecting the receiver to the engine.
Figure 11:
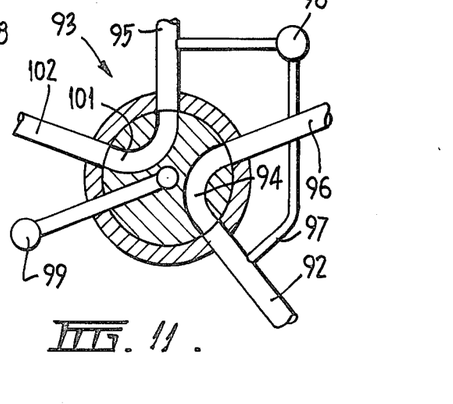

The supply of air from the receiver to the engine is manually controlled by the twin port cock 93 shown in FIGS. 10 and 11. When the engine is operating normally, the cock is in the position shown in FIG. 10. In this position, only the port 94 is open, placing the pipe 95 from the air compressor in communication with the pipe 96 leading to the transfer valve or valves of the engine. Small bore pipe 97 allows air from the compressor to pass through non-return valve 98 to the receiver at all times.

When the cock is moved to the position shown in FIG. 11 by rotation of a handle 99, both ports are open, port 94 placing the pipe 92 leading from the air storage receiver in communication through the pipe 96 with the transfer valve or valves of the engine. The other port 101 of the valve vents the air compressor to atmosphere through the pipes 95 and 102. When additional air is no longer required, the handle 99 is returned to the position shown in FIG. 10, and normal operation is resumed.

Figure 12:
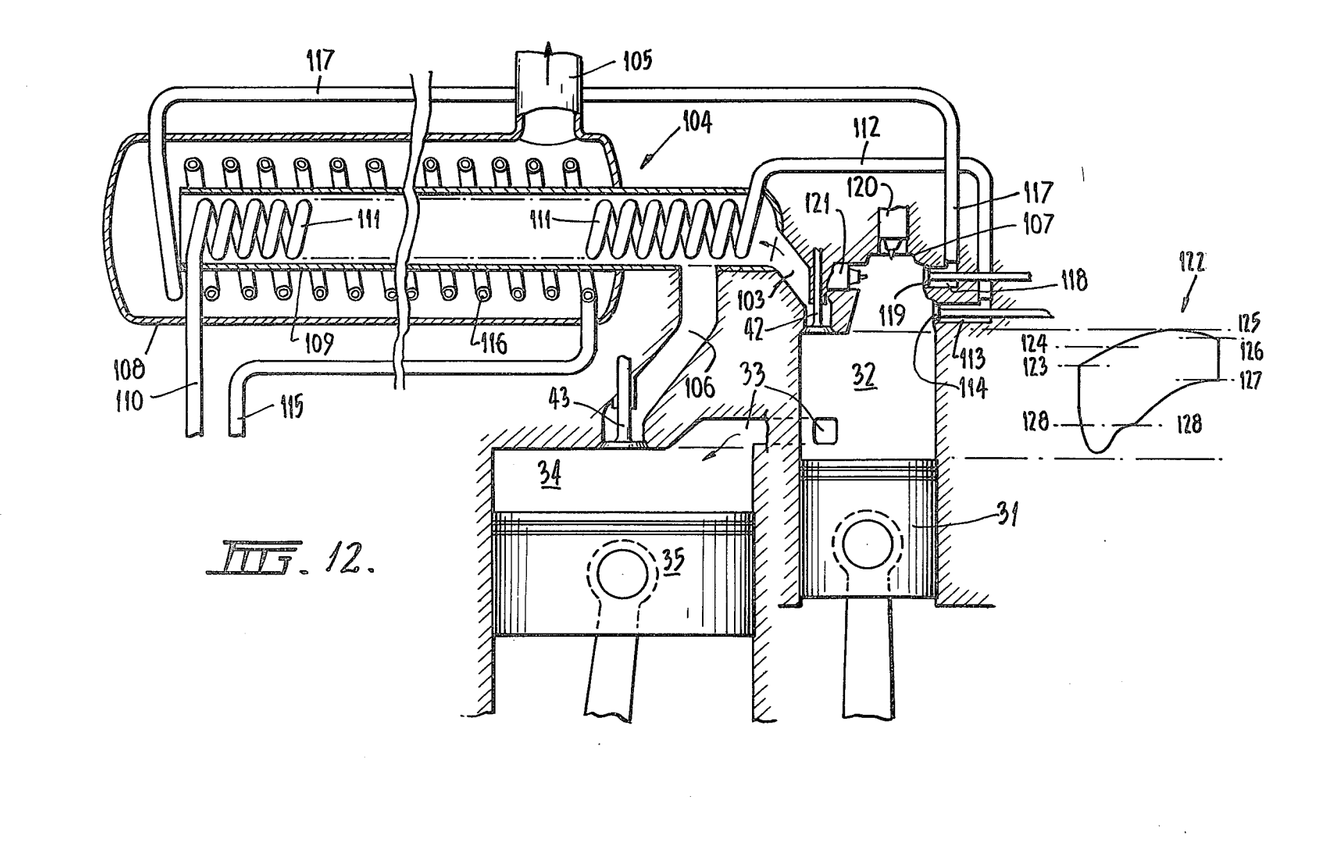
FIG. 12 is a cross-section of the firing and expansion cylinders of an engine in which ignition is initiated by a hot pilot air charge.

FIG. 12 illustrates one means for initiating ignition by means of a hot pilot charge of air into which diesel fuel is sprayed. The piston 31 reciprocates in the firing cylinder 32 from bottom dead centre as depicted to top dead centre at which it reaches very close to the top of the cylinder. The cylinders 32 and 34 are placed in communication by the transfer port 33 which is uncovered as the piston 31 approaches bottom dead centre.

Exhaust gases from the cylinder 32 pass through the exhaust valve 42, then through a lagged pipe 103 to a heat exchanger 104, and thence through an exhaust outlet 105 to the atmosphere. Exhaust gases from the cylinder 34 pass through the exhaust valve 43, then through a lagged pipe 106 to the lagged heat exchanger 104 and thence to the atmosphere through the exhaust outlet 105. The cylinder 32 has an ignition dome 107 of relatively small volume opening from the end remote from the transfer port 33.

The heat exchanger 104 consists of a cylindrical casing 108 and a coaxial cylindrical tube 109 extending through the end of the casing nearest to the cylinders 32 and 34. The projecting end of the tube 109 is closed. The exhaust outlet 105 opens from the casing 108. A pipe 110 extends through the wall of the casing 108 and the wall of the tube 109, where it is joined to a helical coiled pipe 111 extending along the inside of the tube 109 and joined at the other end to a lagged pipe 112, leading to a port 113 in the ignition dome 107 closed by a pilot air valve 114. A pipe 115 leads through the wall of the casing 108 to join a helical coiled pipe 116 extending along the interior of the casing between it and the tube 109. The other end of the coil 116 opens into a lagged pipe 117 which leads to a port 118 in the ignition dome 107 closed by the main air transfer valve 119.

A pintle type injector 120 is located in the wall of the ignition dome 107 to direct a cone shaped spray of pilot diesel fuel from a diesel fuel pump (not shown) into the ignition dome and thereby saturate the air in the ignition dome. A further pintle injector 121 is located in the wall of the ignition dome 107 opposite to the air transfer valve 119.

Ignition is effected by a hot precompressed pilot charge consisting of a small part of the total air charge which is separately admitted to the firing cylinder through the pilot air valve much earlier than the main charge. This pilot charge is heated to a high temperature by external heating before it enters the firing cylinder 32, and is further heated by compression as the firing piston 31 rises to the top of its exhaust stroke. The external source of heat is engine exhaust heat, supplemented on occasion by an electric heating coil or gas jet as required, for example when the engine is starting up from cold.

Ignition must be initiated before the piston 31 reaches its top dead centre, to allow time for combustion of the pilot charge of air to be in full operation by then. During the upstroke of the piston 31 the exhaust gases from the previous stroke are expelled, and the exhaust valve 42 must close before the pilot air valve 114 opens. A balance must therefore be struck between a too early closing of the exhaust valve 42 trapping an excess of exhaust gases, and a too late closing not allowing sufficient time for the pilot charge of air to enter, to be further compressed, and to be ignited before top dead centre. Pressure and amount of pilot air are important related factors, as well as the volume of the space available for the pilot air. Also important is the duration of opening of the pilot air valve 114.

In operation, when the pilot valve 114 opens, the pilot charge of air flows from the compression cylinder at approximately 9.5 kg/sq.cm through pipe 110, then through the coil 111, then through the pipe 112 to the port 113. The weight and pressure of air in each pilot charge are constant and do not vary when the engine speed or load varies. The coil 111 is heated by the hottest exhaust gases from the firing cylinder 32. The hot pilot air passes through the valve 114 into the ignition dome 107 where it encounters diesel fuel injected by the injector 120.

When the valve 119 opens, the main air charge from the compression cylinder passes through the pipe 115, then through the coil 116 which is heated by gases of lower temperature than those heating the coil 111, then through pipe 117 to the port 118. On passing through the valve 119, the main air charge meets a spray of pulverised main fuel from fuel injector nozzle 121, which may be a cheaper and heavier fuel than the diesel fuel mixing with the pilot air charge.

The relationship between pressure and volume in the combustion chamber of the firing cylinder 32 under full load is shown on the graph 122 drawn at the side of the combustion chamber. Pressure is plotted in the horizontal direction, and piston displacement in the vertical direction. The valve 114 opens when the piston 31 is rising through the level 123, approximately 50 degrees before top dead centre. When the piston is at level 124, the valve 114 closes, the gas in the cylinder 32 comprises approximately one part by volume residual exhaust gases and two parts of pilot air charge at a pressure of approximately 9 kg/sq.cm and a temperature of approximately 500 degrees C. The piston 31 continues to rise, compressing the gas, until at top dead centre, i.e. level 125, the pressure of the gas in the cylinder 32 is approximately 45 kg/sq.cm and its temperature is approximately 800 degrees C. i.e. sufficiently high to ignite the diesel fuel injected by the pintle injector 120 as the rising piston 31 approaches top dead centre. Ignition is accordingly initiated, and the pressure in the cylinder 32 continues to rise as the piston 31 descends, reaching a maximum at the level 126. At this stage, the main air transfer valve 119 opens and the pintle injector 121 begins to inject a spray of the main fuel. The main fuel burns immediately on entry, and the pressure in the cylinder 32 remains constant at the pressure of the entering air as the piston 31 descends, until it reaches level 127. The valve 119 now closes, and the fuel pump ceases to supply fuel to the injector 121, so that the pressure in the cylinder 32 falls steadily until the piston 31 reaches level 128 at which the transfer port 33 is uncovered, and the gases can pass into the expansion cylinder 34 where the piston 35 is at top dead centre. As the pistons 31 and 35 both continue their downward movement, the pressure of the gases in cylinder 32 falls rapidly. When the piston 31 passes through bottom dead centre and rises to level 128, the exhaust valve 42 opens and allows the hot exhaust gases to pass into the tube 109. When the piston 31 reaches level 123, the exhaust valve 42 closes, and pilot air valve 114 opens to admit hot pilot air for the next cycle. Just before piston 35 reaches bottom dead centre, the exhaust valve 43 opens to allow the hot spent gases to be expelled through pipe 106 to the tube 109, and the cooled mixed gases pass through the exhaust outlet 105 to the atmosphere.

Referring now to FIGS. 13 to 16, an alternative means of ignition is shown, comprising an incandescent tube. Although incandescent tube ignition has been known for many years, the fact that precise timing means were not available has led to its being superseded by spark ignition in conventional petrol engines. An incandescent tube 129 of known construction is made from heat resisting material, for example metal or ceramic. It opens from the combustion dome 130 of the firing cylinder and projects outwardly. The outer end is closed. The tube is maintained at its high temperature by electrical means or by an external flame playing on its outside surface. The tube 129 is thickened at its open end to form a flange 131, which is clamped against a copper gasket 132 resting on the outside of the combustion dome 130, by a separate clamping ring 133.

Several methods of electrically heating the tube 129 are shown in FIGS. 13 to 16. In the method shown in FIG. 13, an electric heating element 134 of flat section wire is earthed at the lower end on the flange 131, and connected at the other end 135 to a source of low voltage electric current (not shown). In the method shown in FIG. 14, an element 136 of round section wire is substituted for the element 134 of FIG. 13. The element 136 is enclosed in a metal sheath 137 welded at the bottom end to the flange 31, and the space surrounding the coil between the tube 129 and the sheath 137 is filled with an inert refractory powder as in conventional domestic cooker hot plates. In the method shown in FIG. 15, the heating element is a silicon carbide sheath 138 shaped to fit over the tube 129 leaving a narrow gap between them in order to insulate them electrically. The bottom end of the sheath 138 contacts the flange 131, and the top end is in contact with a metal plate 139 which is connected to the source of low voltage electric current. The sheath 138 is readily electrically conducting at its top and bottom, but has a resistance in the intermediate portion, so that heat is developed as current passes through it. In the method shown in FIG. 16, the tube 12 is closely surrounded by heat and electrically insulating material 140. The middle portion of the tube 129 and the insulation 140 is surrounded by a heavy section gapped copper ring 141 connected through equally heavy section copper conductors 142 to an induction coil 143, which supplies very high frequency electric current of low voltage and high amperage, thereby heating the tube 129.

When the transfer valve of the firing cylinder opens, an inflammable mixture comprising portion of the charge of compressed air and portion of the fuel injected enters the combustion chamber dome 130. A small portion of this inflammable mixture is forced by the increasing pressure into the incandescent tube 129. The piston is at this time at or near top dead centre. The mixture in the tube 129 is ignited, and the flame is ejected into the remaining mixture in the combustion dome 130, thereby instigating its combustion to develop the power stroke of the engine.

Timing of the ignition in all the incandescent tube means of ignition is achieved by timing both the opening of the transfer valve and the commencement of the fuel pump delivery stroke simultaneously, for ignition occurs immediately a combustible mixture fills up the incandescent tube. The timing of the closing of the transfer valve and of the end of the fuel pump delivery stroke have no bearing on the ignition timing.

For engines such as industrial types, a fixed ignition timing, which does not need adjustment when engine speeds and loads vary, is suitable. Other engines, including most of those in road vehicles, need the ignition timing to be automatically adjusted in response to variation in engine speed and load. In split cycle engines automatic adjustment is effected by a conventional centrifugal ignition advance and retard mechanism, and superimposed thereon, an automatic advance and retard mechanism comprising a diaphragm, or metal bellows, operated by the pressure of the air leaving the compressor. This automatic advance and retard mechanism comprises two identical cam followers, one operated by the transfer valve cam to actuate the transfer valve, and the other operated by the fuel pump cam to actuate the fuel pump.

Figures 13, 14, 15, 16, 17:
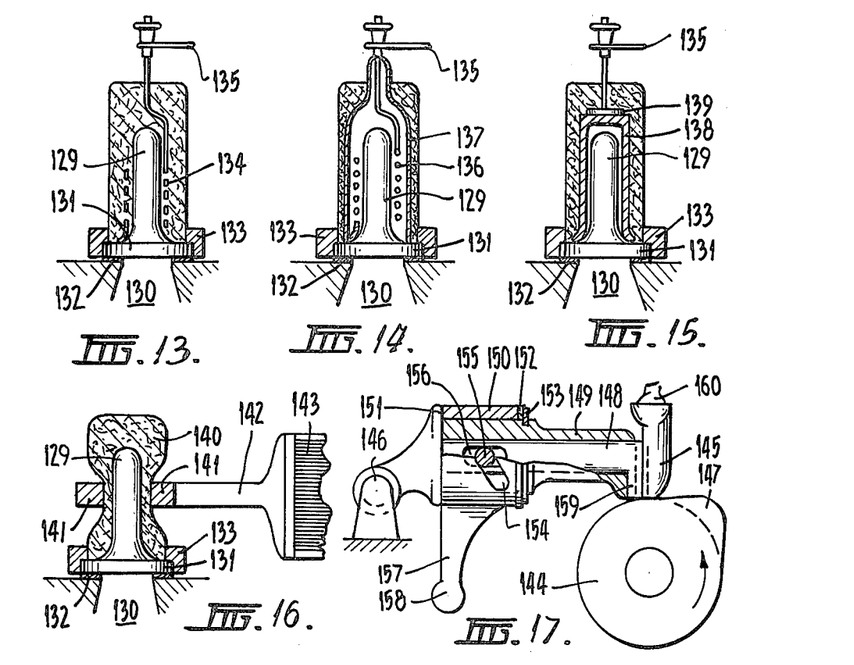
FIGS. 13 to 16 are cross sections of ignition means employing incandescent extensions of the firing cylinder.
FIGS. 17 and 18 show automatic timing and fuel control means.
Figure 18:
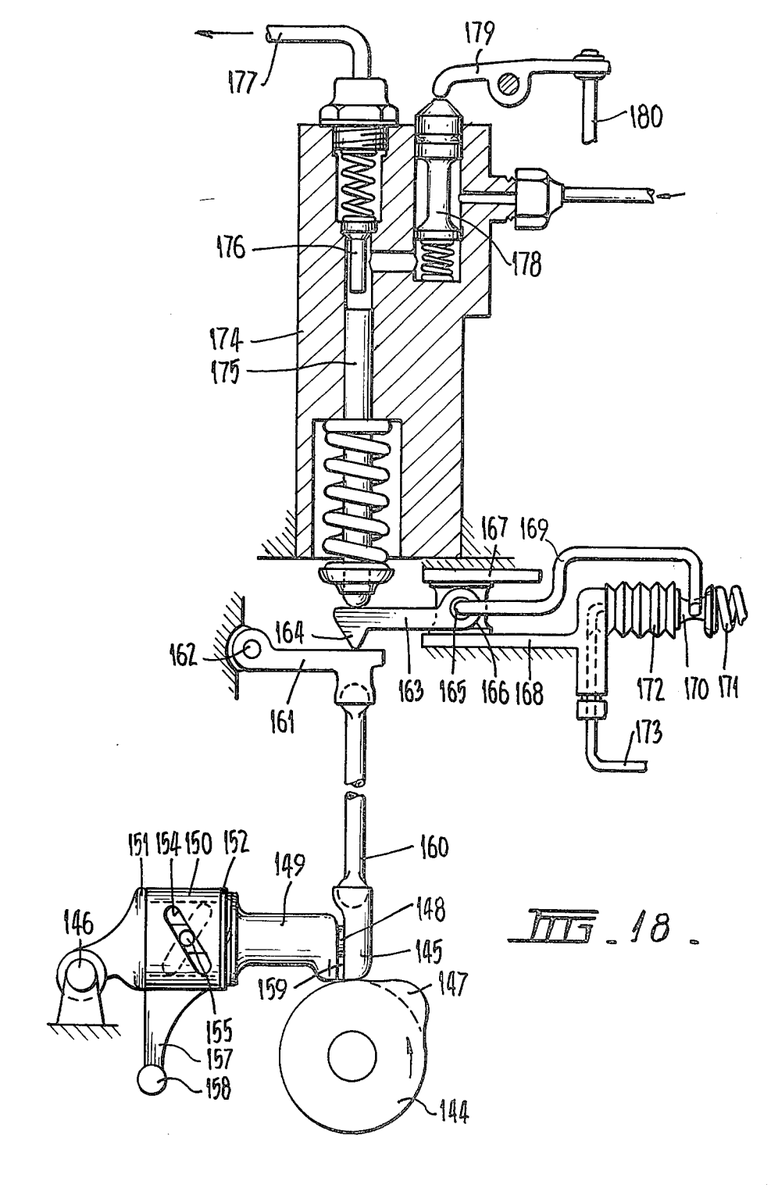

One of these cam followers will now be described with reference to FIGS. 17 and 18. The cam 144 rotates anti clockwise at crankshaft speed lifting the cam follower shoe 145 around a pivot 146 fixed to the engine frame. When the distance of the shoe 145 from the pivot 146 is increased, the shoe is lifted earlier by the cam lobe 147 to advance the operation of the transfer valve or fuel pump respectively. Conversely, when the distance of the shoe 145 from the pivot 146 is reduced, the shoe is lifted later by the cam lobe 147 to retard the operation of the transfer valve or fuel pump. As the shoe 145 moves closer or further away from the pivot 146, a solid stem 148 formed on the side of the shoe slides within a hollow elongated member 149 extending from the pivot 146. A sleeve 150 which rotates around the member 149 in the vicinity of the pivot 146, is retained in place between a collar 151 at one end and a washer 152 and circlip 153 at the other end. The sleeve 150 has a helical slot 154 formed in one side and a similar slot sloping in the opposite direction in the opposite side. A corresponding hole is formed through the stem 148, and a pin 155 fits tightly in the hole to project through both slots and through a longitudinal slot 156 formed through the elongated member 149. Fixed to the outside of the sleeve 150, is a lever 157, to the outer end of which is fixed a ball 158.

As the ball 158 is moved parallel to the axis of the pivot 146, the sleeve 150 is rotated, so that the slot 154 moves the pin 155 and the stem 148 along the elongated member 149 to increase or decrease the distance of the cam follower 145 from the pivot 146. This movement of the ball 158 is effected by a conventional centrifugally operated linkage, or/and by a diaphragm or a bellows operated by the pressure of air in the compressor. Ball 158 on the transfer-valve cam-follower and ball 158 on the fuel-pump cam-follower are actuated simultaniously by the one linkage.

The cam follower shoe portion 145 has a wearing surface where it contacts cam profile 147 across the full width of the cam at its leading edge. Portion 159 of the elongated member 149 has a wearing surface across the full width of the cam at its trailing edge. The gap between them is bridged by a tongue in member 159 which engages in a groove in portion 145.

Two similar cam followers 145 are needed to supply a timed mixture of air and fuel to each combustion dome of the engine. Their two push rods 160 are also similar, but the upper end of one actuates its associated transfer valve in a conventional manner (not shown). The push rod 160 which actuates the fuel pump is shown in FIG. 18, and its upper end engages one end of a lever 161, which is pivoted at the other end at 162 to the engine frame. The lever 161 has a flat surface on the side opposite from that engaging the push rod 160. A lever 163 having at one end a projection 164 resting on the flat surface of the lever 161, and a flat surface on the side opposite from the projection 164, is pivoted at 165 to a crosshead 166 sliding between guides 167 and 168. The crosshead 166 is moved along the guides by a rigid rod 169 connected at one end to the pivot 165 and at the other end to a coupling 170 which also connects a helical spring 171 to a metal bellows 172 having the same longitudinal axis. The pivots 162 and 165 are located on opposite sides of the axis of the pushrod 160, so that the levers 161 and 163 rotate in opposite directions. If the pushrod 160 is raised, for example, lever 161 rotates anticlockwise while lever 163 rotates clockwise. The interior of the bellows 172 is connected to the compressor outlet by a small bore pipe 173.

The fuel is in liquid form and is supplied to the engine by a pump 174 having a plunger 175. The fuel delivered by an upward stroke of the plunger 175 as viewed in FIG. 18 passes through a spring loaded delivery valve 176, then through a fuel delivery pipe 177, to the engine. Fuel is admitted to the pump 174 through a valve 178 opened by a rocker 179 operated by a pushrod 180 from a cam (not shown) rotating at crankshaft speed.

The fuel must be supplied at a pressure at least as high as the the pressure of the compressed air entering the combustion dome, and at a rate which changes to match the changing weight of air entering the firing cylinder. The air with fuel entrained begins to enter the empty combustion dome while the engine piston is at or near top dead centre, and enters at an extremely rapid rate. As the combustion dome fills, the rate of entry decreases, but increases again as the piston accelerates on the first part of its power stroke and makes more room available. The expansion of gases in the firing cylinder caused by combustion halts momentarily the entry of air until the gathering speed of the piston lowers the pressure in the cylinder to allow more air to enter. The fuel must, throughout the firing stroke, be supplied at a rate such that the mixture is maintained combustible. The limits, from the stoichiometric mixture strength, are between 78% weak and 200% rich. The mixture at the beginning of the stroke should be 120% rich to assist ready ignition, and should be progressively weakened to give an overall average stength of 90% weak. Carbon monoxide emissions are thereby prevented, and the fuel economy is improved.

The desired variation in the amount of fuel supplied to the firing cylinder is achieved in the following way by the arrangement above, with reference to FIGS. 17 and 18. The cam 144 is shaped to provide the correct fuel supply when the engine is on full load. When the power of the engine is reduced by easing off the accelerator pedal or by the engine speed governor, rate of admission of atmospheric air to the compressor falls and its absolute pressure falls in the same proportion. The pressure of air inside the bellows 172 therefore falls by the same amount, permitting the spring 171 to force the rod 169 and pivot 165 to the left as viewed in FIG. 18. The projection 164 is thereby moved to the left along the flat surface of the lever 161 i.e. nearer to the pivot 162 and the amount by which it is lifted in response to upward movement of the pushrod 160 is reduced. Also, the pivot 165 is moved closer to the pump plunger 175, so that the amount by which the plunger is raised by lifting of the projection 164 is reduced. Both reducing effects reinforce each other, so that the pump plunger 175 is lifted by a smaller amount than when the engine is under full load and the pressure of air from the compressor is at a maximum. It is therefore possible to achieve correct proportioning of air and fuel under all operating conditions of the engine.

The fuel must be intimately mixed with the air stream entering the firing cylinder. Three alternative methods of achieving this are shown in FIGS. 19 to 21.

Figure 19:
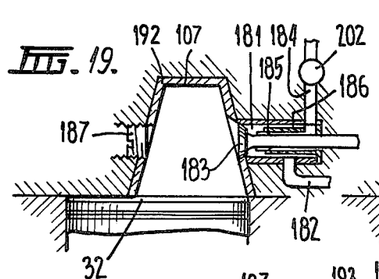
FIGS. 19 to 21 are diagrammatic cross sections of fuel/air mixing arrangements.

Referring to FIG. 19, hot compressed air enters transfer valve port 181 of firing cylinder 32 through a pipe 182. After admixture with the fuel, it then passes into the combustion dome 107 of cylinder 32 through a transfer valve 183. Fuel is supplied through a pipe 184 and non return valve 210 to an annular jet 185 surrounding a valve stem guide 186. The jet 185 extends beyond the guide 186 to almost touch the underside of the head of the valve 183. A removable plug 187 provides access to the valve 183 to permit maintenance.

As transfer valve 183 opens, air and fuel, which have been supplied in the correct proportions, are mixed as they are swept into the cylinder. This method operates at comparatively low pressure, and is most suitable for clean, highly volatile fuels, for example liquid propane and butane.

Figure 20:
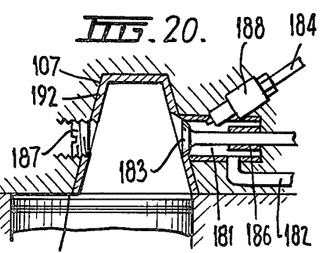
Figure 21:
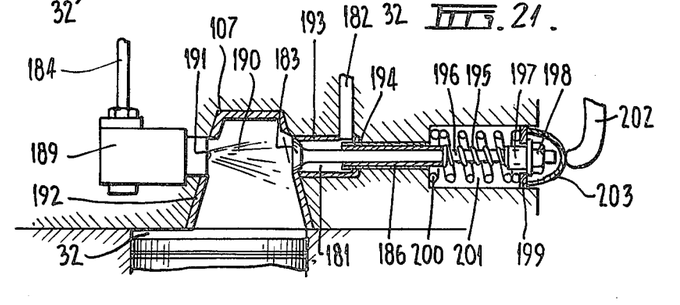

Referring to FIG. 20, hot compressed air enters the transfer valve port 181 through the supply pipe 182. Fuel entering from pipe 184 passes through a spring-loaded outward opening valve type fuel injector 188 disposed at an angle of approximately 30 degrees to the stem of the valve 183, which injector sprays the fuel in a cone around the periphery of the back of the valve 183. While transfer valve 183 is open fuel spray from the fuel pump and air from the compressor pass the valve seat together at high speed and enter the combustion dome 107. This method requires a moderate fuel pump pressure and is suitable for light fuels, for example, petrol and kerosene.

Referring to FIG. 21, hot compressed air enters the transfer valve port 181 through the supply pipe 182. Fuel is supplied through the pipe 184 to a diesel type fuel injector 189, which injects it in the form of a conical spray 190 through an inwardly opening pintle type valve 191 located in the wall of the combustion dome 107 opposite from the transfer valve 183. The cone 190 is wider at the base than the diameter of the head of the valve 183. The fuel issues from the injector 191 at the same time as the air enters the combustion dome 107 from the transfer valve 183. No fuel enters the transfer valve port 181, and this method is most suitable for heavy fuels which are likely to leave carbon deposits if they encounter surfaces not hot enough to burn the carbon off.

A loose fitting lining 192, of heat resisting metal, is fitted to the inside of the combustion dome 107. As the lining 192 becomes very hot during operation of the engine, it expands to press tightly against the water-or air-cooled walls of the combustion dome. It is therefore maintained at a dull red heat, and prevents carbon deposits from forming. A similar liner 193 may be placed inside the transfer valve port 181, and a sheath 194 of the same heat resisting metal may be placed around the valve guide 186. These will act as heat barriers to reduce loss of heat from the incoming hot compressed air, thereby improving the thermal efficiency of the engine. Under some conditions of ignition, particularly in engines which have no automatic advance and retard ignition means fitted, combustion occuring too early may cause a blowback of burning mixture back through transfer valve 183 into port 181, and air pipe 182, soon after ignition has been initiated. To prevent this, and also to keep a constant high velocity of air or mixture passing across the seat of transfer valve 183, a small second spring 195 may be fitted over valve stem 196, to maintain at all times a closing tension which will give approximately 1.4 kilograms per square centimeter difference in pressure across the valve seat during the open periods of the valve.

To accomplish this, the end of valve stem 196 is threaded, and on to it are screwed two nuts 197 and 198. Nut 198 is a lock nut for nut 197, which is long and has a normal hexagon at its outer end. Its inner end is of reduced diameter small enough to have clearance inside a large diameter washer 199, against which one end of a heavy helical spring 200 presses, with its other end held against the flat end of a large blind hole 201 in the cylinder head within which the spring 200 is retained. Small helical spring 195 is a loose fit over valve stem 196, and extends from the end of nut 197 to the end of valve stem guide 186, and is at all times exerting a small closing tension on valve 183, as described above. The much greater closing tension on valve 183, exerted by large spring 200, forces washer 199 against nut 197. At the correct opening timing for valve 183, the tip of rocker arm 202 presses against cup 203, and the washer 199, on which the open end of cup 203 pushes, is forced away from nut 197, and allows valve 183 to open under pressure of the compressed air entering combustion dome 107.

What is claimed is:

1. A split cycle internal combustion engine comprising a crankshaft, at least one firing cylinder, for each firing cylinder an expansion cylinder adjacent thereto, each firing cylinder having a transfer port in the lower region of the combustion chamber communicating with the top of the adjacent expansion cylinder, a multistage compressor comprising at least two cylinders operating in series, a piston in each cylinder, means directing air supplied by the high pressure stage of the compressor to the combustion zone of each firing cylinder during the first part of the power stroke, means supplying fuel to the combustion zone of each firing cylinder to mix intimately in the correct proportion with the entering compressed air, means external of each firing cylinder heating the air before entry to the top of the combustion zone, and means controlling the timing of the admission of fuel and of compressed air to each firing cylinder in relation to the position of the piston in said firing cylinder.

2. An engine according to claim 1, wherein the means controlling the timing comprise external means operating to vary the stage of rotation of the crankshaft at which cams rotating with the crankshaft lift cam followers operating a fuel pump and a transfer valve for the compressed air, to thereby advance or retard the ignition timing.

3. An engine according to claim 2, wherein the ignition of the charge is initiated in an externally heated extension of the combustion chamber, said extension being of small volume relative to the combustion chamber.

4. An engine according to claim 1, wherein ignition of the main charge is initiated by admitting a preheated, partially compressed pilot charge of air to the firing cylinder, and further compressing it in the cylinder to further increase its temperature and to thereby ignite a precision-timed pilot spray of fuel of lower temperatue of ignition than the main fuel used in the engine.

5. An engine according to claim 2 or 3, wherein the time of commencement of admission of fuel and the time of commencement of admission of compressed air are each controlled by a cam and a pivoted lever supporting a cam follower in contact with the cam, the length of the lever between the pivot and the cam engaging portion of the cam follower being varied by a linkage actuated by a centrifugal timing mechanism.

6. An engine according to claim 5, wherein the admission and amount of fuel supplied are controlled by two levers lifted by the cam follower, resting one on top of the other, with the upper lever contacting the plunger of a plunger type fuel pump, the pivots for the respective levers lying on opposite sides of the cam follower, and the distance between the pivots being varied in response to variation in the pressure of air leaving the compressor.

7. An engine according to claim 1, wherein the crankshaft is a multi-throw crankshaft, the piston in the low pressure stage of the compressor being connected to a different throw of the crankshaft from the piston or pistons in the higher pressure stages.

8. An engine according to claim 7, wherein the firing cylinder and the expansion cylinder are arranged in line with, and their pistons are connected to different throws of, the crankshaft, and the compression cylinders are arranged in line at 90 degrees to the firing and expansion cylinders, with their pistons connected respectively to the same crank throw as the firing or expansion piston.

9. An engine according to claim 7, comprising a plurality of firing cylinders in line parallel to the axis of the crankshaft, an equal number of expansion cylinders in line to the side of the firing cylinders, compression cylinders in line at the side of the expansion cylinders remote from the firing cylinders, each firing cylinder with its adjacent expansion cylinder and compression cylinder constituting a triple cylinder complex lying on a line perpendicular to the axis of the crankshaft, a rockable beam pivoted at its ends to the compression piston and expansion piston, respectively, of each complex, means connecting the beam to one throw of the crankshaft to rock the beam in timed relation to the rotation of the crankshaft, and a connecting rod connecting the said throw of the crankshaft to the firing piston.

10. An engine according to claim 9, wherein the means rocking the beam comprises a lever fixed perpendicularly across the beam, said lever being rotatable at one end about a pivot fixed with respect to the cylinders and at the other end pivoted to a connecting rod linking it to the throw of the crankshaft.

11. An engine according to claim 1, wherein initial starting up from rest, and boosting the power for short periods while running, are effected by compressed air supplied to the firing cylinder from a cellular storage tank replenished by the engine during its normal running.

12. An engine according to claim 1, further comprising magnetic means for controllably reducing the power of the engine by permitting portion of the air compressed in the low pressure cylinder to be exhaled to the atmosphere.

13. An engine according to claim 2 or 3, wherein the time of commencement of admission of fuel and the time of commencement of admission of compressed air are each controlled by a cam and a pivoted lever supporting a cam follower in contact with the cam, the length of the lever between the pivot and the cam engaging portion of the cam follower being varied by a linkage actuated by air pressure sensing means connected to the compressor outlet.

* * * * *